Mar. 13, 1923.  1,448,267

J. GALLEAZZI

NUT CRACKING MACHINE

Filed July 21, 1922 2 sheets-sheet 1

INVENTOR
J. GALLEAZZI

ATTYS.

Mar. 13, 1923.

J. GALLEAZZI 1,448,267

NUT CRACKING MACHINE

Filed July 21, 1922

INVENTOR
J. GALLEAZZI

BY

ATT'YS.

Patented Mar. 13, 1923.

1,448,267

UNITED STATES PATENT OFFICE.

JOSEPH GALLEAZZI, OF SAN FRANCISCO, CALIFORNIA.

NUT-CRACKING MACHINE.

Application filed July 21, 1922. Serial No. 576,479.

*To all whom it may concern:*

Be it known that I, JOSEPH GALLEAZZI, a citizen of the United States, residing at San Francisco, in the county of San Francisco and State of California, have invented new and useful Improvements in Nut-Cracking Machines, of which the following is a specification.

This invention relates to improvements in nut cracking machines and resides in the provision of a simply constructed and inexpensive apparatus which may be easily and cheaply operated to effectively crack large quantities of nuts in a comparatively short time.

An object of the invention is to provide a nut cracking machine of the character described which includes a plurality of novelly constructed nut cracking devices arranged so that a plurality of nuts may be simultaneously cracked and readily disposed of after the cracking operation, there being special means which automatically operates to permit the cracked nuts to drop out of the cracking devices immediately after the cracking operation.

Another object of the invention is to provide a nut cracking machine of the character described which will be small and compact and arranged so that one or more persons may feed nuts into the cracking devices as desired, the machine being so constructed that it may be readily adjusted to crack various kinds of nuts and nuts of various sizes.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings.

Figure 1:
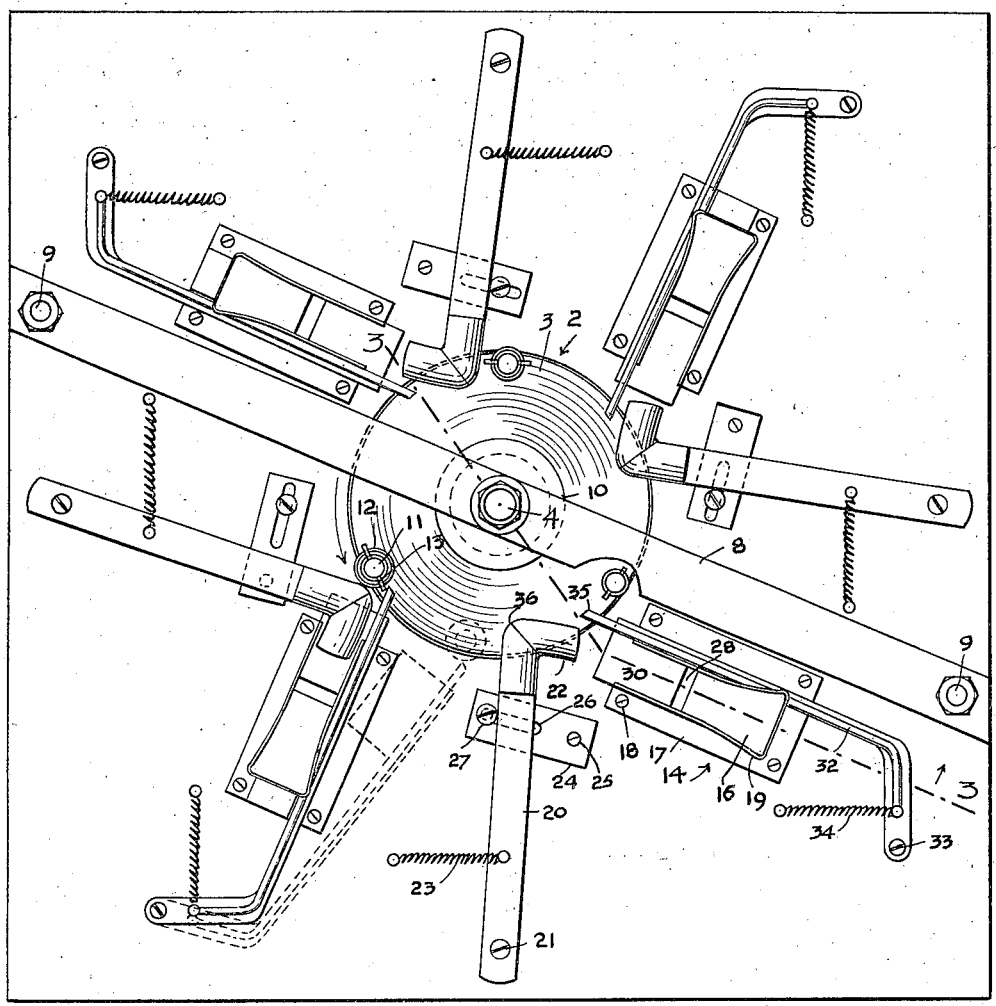
Fig. 1 represents a top plan view of the machine of my invention.
Figure 2:
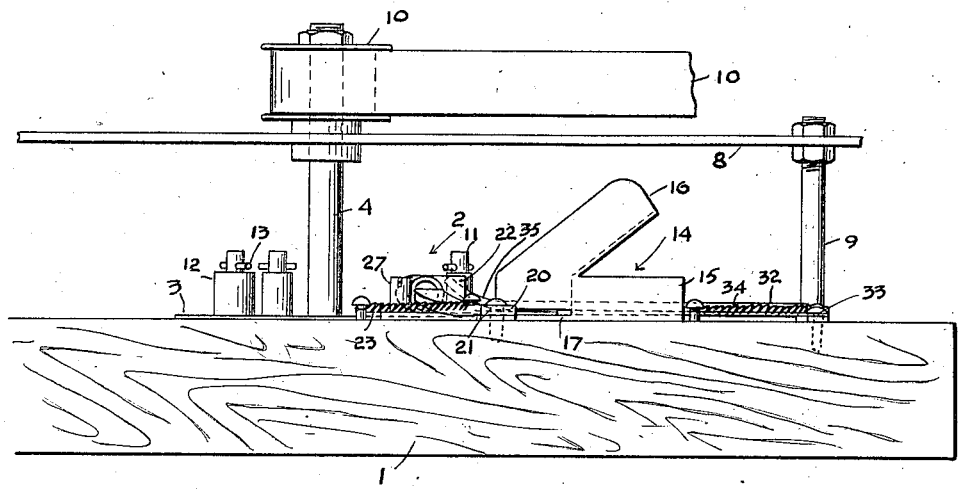
Fig. 2 represents a fragmentary side elevation of the machine.
Figure 3:
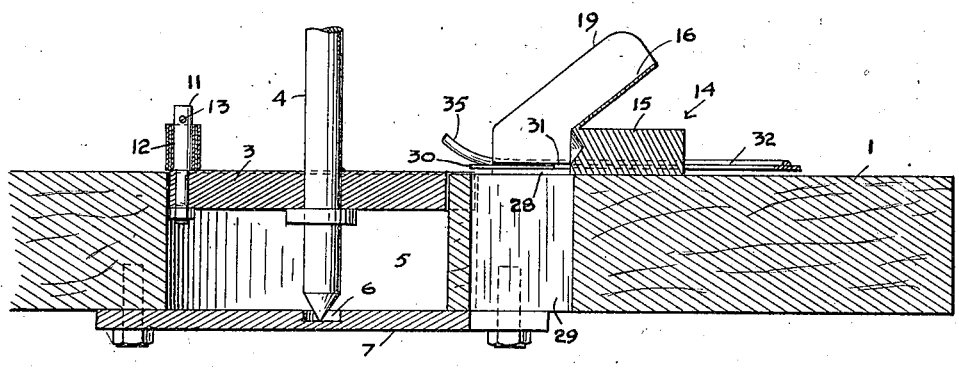
Fig. 3 represents an enlarged fragmentary sectional view of the machine.
Figure 4:
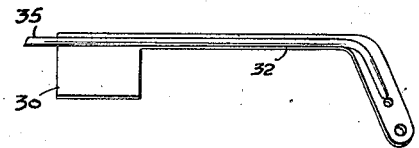
Fig. 4 represents a detail top plan view of the trap member.
Figure 5:
Fig. 5 represents a side elevation of an element of a cracking device shown particularly in section.

Referring particularly to the embodiment of the invention illustrated in the accompanying drawings, 1 represents a base member adapted to be mounted upon a suitable support, not shown, and arranged to support the actuating means 2 of the machine. This means comprises a circular disk 3 fixed to a shaft 4 and mounted in an opening 5 in the base so as to be flush with the latter. The shaft 4 at its lower end engages in a depression 6 formed in a bearing plate 7 fastened to the under side of the base and near its upper end is journaled in a bar 8. The bar 8 is removably supported upon posts 9 carried on the base. A pulley 10 or other means of connecting the shaft with a source of power, is fixed to the upper end of the shaft and provides for rotation of the shaft and disk 3.

A plurality of striker or abutment members 11 in the form of upright posts are carried by the disk near the periphery thereof. Each of the members 11 includes a plurality of sleeves 12, telescopically mounted thereon, the sleeves being held in place by a removable pin 13 inserted transversely through the members 11. By taking off and putting on sleeves 12, the size of the abutments may be varied and the extent of movement of the actuating device increased or decreased, as will be later described.

Mounted on the base 1 at a plurality of spaced points are cracking devices 14 which are actuated by the members 11. Each device 14 comprises a solid metal block 15 and an inclined guide 16 at one end of the block. The block is carried on a plate 17 secured by fastenings 18 to the base and is provided with a preferably conical depression at one end to facilitate the holding of the nuts. The guide 16 has side flanges 19 which extend beyond the end of the block and with the latter form a nut holding pocket. The nuts are placed on the guide and pushed downwardly thereon to a position between the flanges 19 so as to engage the end of the block having the depression therein. The guide permits of an easy and expeditious placing of the nuts into position to be cracked.

A plurality of cracking arms or hammers 20 are pivoted as at 21, at certain ends to the base 1. The other ends of the arms 20 are enlarged and have right angular head portions 22 arranged to extend into the spaces between the flanges 19 and strike the nuts. Retractile springs 23 are fixed to the base and arms so as to normally hold the arms retracted and in position to be engaged by the members 11. The arms are mounted to slide upon wear plates 24, each of which wear plates is secured by fastenings 25 to the base 1. Each wear plate is provided with a slot 26 in which a removable stop member 27 is adapted to be engaged by the arm to limit its movement, and is preferably in the nature of a screw whereby its position may be changed to vary the lengths of the stroke of the arm in the working of the machine.

The nut engaging end of the head 22 may be provided with a depression or the head formed as a hollow member, as desired, to insure secure engagement of the head with the nuts.

As a means of disposing of the nuts after the cracking thereof, each of the plates 17 is provided with an opening 28 registering with an opening 29 extending through the base member 1. A trap member 30 is movable into and out of a position closing said opening 28, through a slot 31 formed in one of the flanges 19. The member 30 is carried on the end of a substantially L-shaped arm 32, one end of which is pivoted as at 33 to the base 1. A retractile spring 34 is secured to the base 1 and to the arm 32 at a point on the latter near its pivoted end, said spring being arranged to normally hold the arm in such position that the trap member 30 will close the opening 28. Extending outwardly from the member 30 is a trip member 35 adapted to be engaged by the members 11 so as to cause the member 30 to be moved out of position closing the opening 28.

In the operation of the machine a number of attendants or operators will stand around the mechanism and after the actuating means 2 is put into operation, may place nuts to be cracked into the guide members 16. The nuts after being placed in the guide members are pushed downwardly by the operators until they rest upon the trap members 30 between the flanges 19 and engage with the adjacent end of the blocks 15. As the disk 3 rotates the members 11 will engage the striker arms and quickly move them so that the members 22 thereof will strike and be pressed against the nuts. The force of the blow and pressure of the heads against the nuts will serve to crack them. It will be noted that the portions of the heads which are engaged by the members 11 are rounded as at 36 so that the smoothness of operation will take place as the members 11 disengage from said arms. Immediately after the members 11 engage the arms and the nut has been cracked, said members will engage the trip members 35 and withdraw the trap members 30 from position supporting the nuts, whereupon the nuts will fall through the openings 28 and 29 and into a suitable receptacle, not shown, or in fact any container which may be placed beneath the machine.

Upon the disengagement of the members 11 with the trips 35, the springs 34 will return the arms 31 and parts carried thereon to normal position. The springs 23 will function in the same manner to return the striker arms to normal position after the cracking operation of said arms. It will thus be seen that a number of persons may feed nuts into the machine and cause them to be effectively and expeditiously cracked. The manner of disposing of the cracked nuts facilitates the speedy operation of the machine.

When it is desired to increase the action of the striker arms, the number of sleeves on the members 11 may be increased and likewise removal of the sleeves will decrease the force of the action of said arms. The increasing of the number of sleeves will move the striking members 22 to a greater extent. Increasing the stroke of the arms may also be effected by changing the position of the stop members 27 so that the arms will be moved outwardly to a greater extent by the springs 23 and begin their strokes from a point further removed from the point of contact with the heads and the nuts.

I claim:

1. A nut cracking machine comprising a base member having a circular series of nut holders thereon, striker members pivoted on the base arranged to be moved into position to engage and crack nuts held by said holders, spring means normally holding said striker away from said holders, a rotary member and a plurality of abutment members on the member arranged to engage and move the striker arms into nut cracking position upon rotation of said rotary member.

2. A nut cracking machine comprising a base member having a circular series of nut holders thereon, striker members pivoted on the base arranged to be moved into position to engage and crack nuts held by said holders, spring means normally holding said striker away from said holders, a rotary member, a plurality of abutment members on the member arranged to engage and move the striker arms into nut cracking position upon rotation of said rotary member, said base and holders having openings therein in the lower sides thereof through which nuts after being cracked are adapted to pass, a trap member normally closing said opening and means operated by the abutment for swinging the trap door immediately following the operation of a striker arm.

3. A nut cracking machine comprising a base member, nut holder mounted on the base member, a rotary member on the base member, a striker arm adapted to engage and strike a nut mounted in the holder, spring means normally holding the striker arm in inoperative position and an abutment on the rotary member arranged to engage and move said striker arm into striking position upon rotation of said rotary member.

4. A nut cracking machine comprising a base member, a nut holder mounted on the base member, a rotary member on the base member, a striker arm adapted to engage and strike a nut mounted in the holder, spring means normally holding the striker arm in inoperative position, an abutment on the rotary member arranged to engage and move said striker arm into striking position upon rotation of said rotary member and means for varying the size of the abutment to regulate the stroke of the striker member.

5. A nut cracking machine comprising a base member, a nut holder mounted on the base member, a rotary member on the base member, a striker arm adapted to engage and strike a nut mounted in the holder, spring means normally holding the striker arm in inoperative position, an abutment on the rotary member arranged to engage and move said striker arm into striking position upon rotation of said rotary member, said nut holder and base having registering openings through which cracked nuts are adapted to drop, a trap door normally closing said openings and means actuated by said abutment for opening the trap immediately after a striking operation of the striker arm.

JOSEPH GALLEAZZI.